F. W. Dexter,
Boring Hubs.
№ 35,015. Patented Apr. 22, 1862.
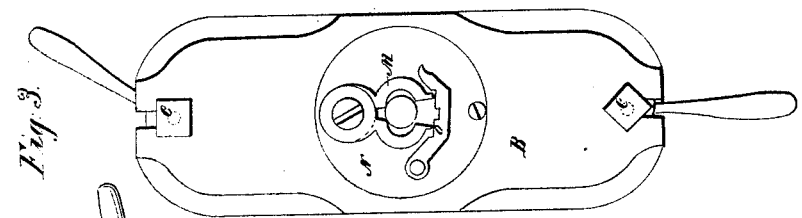
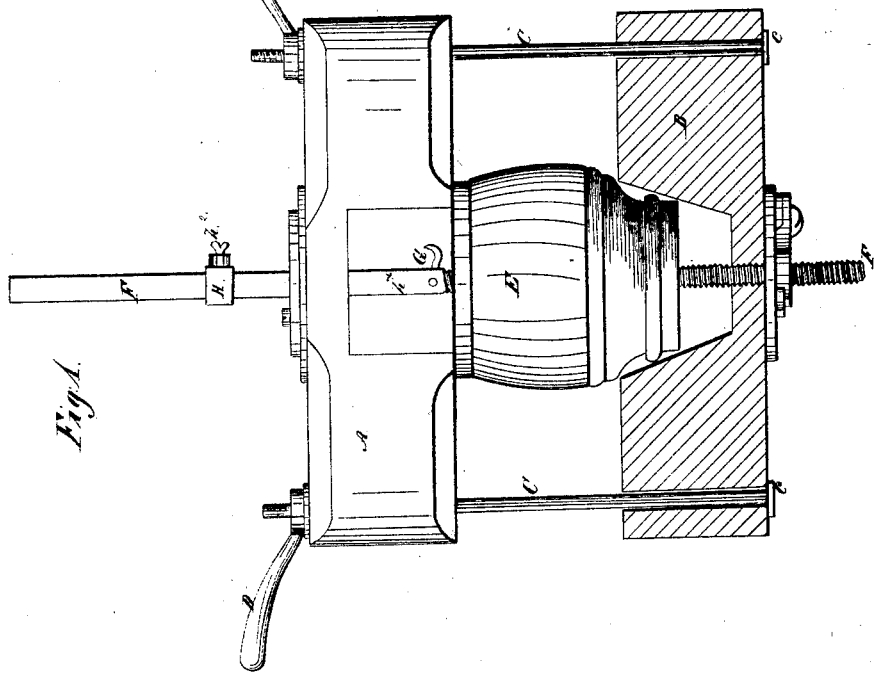
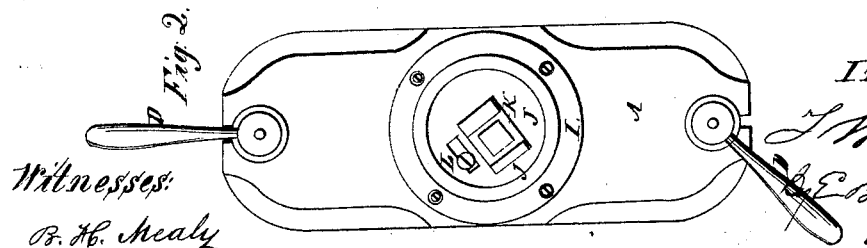
Witnesses:
B. H. Mealy
Saul H. Dubois
Inventor:
F. W. Dexter
E. B. Forbush
Attorney

UNITED STATES PATENT OFFICE.

FREDERICK W. DEXTER, OF RANDOLPH, NEW YORK.

IMPROVEMENT IN BOX-SETTERS FOR WHEEL-HUBS.

Specification forming part of Letters Patent No. 35,015, dated April 22, 1862.

*To all whom it may concern:*

Be it known that I, FREDERICK W. DEXTER, of Randolph, in the county of Cattaraugus and State of New York, have invented a new and Improved Self-Centering Thimble-Skein Box-Setter; and I do hereby declare that the following is a full, clear, and exact description of the construction and operation of the same, reference being had to the accompanying drawings, in which—

Figure I is a plan view partly in section. Fig. II is a plan showing the eccentric center in combination with the head-piece of the clamp. Fig. III is a plan showing the open nut in combination with the cone-piece of the clamp.

The nature of my invention relates, first, to the construction of a clamp for holding the hub for boring, as hereinafter described; second, to a gage upon the auger-shaft, as hereinafter set forth.

Letters of like name and kind refer to like parts in each of the figures.

The clamp for holding the wheel or hub for boring consists of the head-piece A and cone-piece B, screw-rods c, and handle-nuts D. The small end of the hub is put into the cone-shaped mortise of the cone-piece B, and the head-piece A is then brought down upon the large or square end of the hub and the nuts D turned down, so as to clamp and hold the hub firmly. The cone-shaped mortise will insure the hub a perpendicular position in the clamp, and its cone shape also adapts it equally to hubs of different sizes.

E represents the hub or wheel held by the clamp in position for being bored.

F is the cutter or auger shaft, one part of which is made square for connection with a bench or vise, and the other part has a screw-thread cut upon it.

G represents the cutter or auger of suitable form. It has a shank which enters a mortise in the shaft, and is made fast therein by means of the key or wedge $h'$. The auger projects at right angles from the shaft, and by means of its shank and key it may be set so as to bore a hole of any required size through the hub.

H is a gage which slides upon the square part of the auger-shaft, and by means of its set-screw $h^2$ may be set at any place desired on the shaft to determine the depth of hole to be bored for a short or ordinary box. The distance between the gage and eccentric will determine the depth of hole to be bored.

I J K L represent an eccentric center-piece. It is composed of an external ring, I, which is screwed to the head-piece A and made stationary, and the central revolving disk, J, slide K, and set-screw L. The revolving disk J has a long slot, as shown at $j'$. In this slot is placed the slide K, which may be fixed or held at any place in the slot by means of the set-screw L. The slide K has a square mortise through it, as shown at K'. The auger-shaft passes through this slot and moves laterally with the slide, and may be set at any required distance from the center of the revolving disk for boring a tapering hole through the hub. A straight hole may also be bored by setting the shaft at the center of the revolving disk.

M represents what is called an "open nut." It is made in two parts, which parts are hinged together and fastened to the circular plate H, as shown at P.

O shows a clasp having a notch, $r$, which fits on over two projecting nibs, S, of the nut to hold the two parts of the nut together.

Operation: The wheel or hub to be bored is put into the clamp, as represented in the drawings, and the square end of the auger-shaft is made fast to the bench or vise, so that the clamp, and with it the wheel, will revolve on the shaft. The wheel may then be "trued up" in a common manner by slight blows upon the head-piece A. The auger-shaft will then be set at such point in the eccentric center as will give the required taper to the hole through the hub for the reception of a thimble-skein. The cutter or auger will also be correspondingly set to give the required size or diameter of the hole, the screw end of the shaft being in the nut M. The clamp, and with it the wheel, is now caused to revolve in the direction to feed the hub to the auger or cutter. The open nut is held closed by the clasp O and runs upon the screw-thread of the shaft and constantly approaches the cutter until the cutter has passed through the hub. Inasmuch as the distance between the nut (as a center) and the cutter diminishes at each revolution, so the radius of the cutter will correspondingly diminish; consequently a true taper hole is made through the hub, as required for the reception of a thimble-skein. When the cutter has passed through the hub, as described, the nut M may be opened and the clamp adjusted for another wheel without turning the nut back on the shaft. This saves time and labor. When a straight hole is to be bored for a short box, the cutter-shaft is set at the center of the disk J and the gage H set for the depth of the hole.

What I claim as my invention, and desire to secure by Letters Patent, is—

A clamp for holding the hub for boring, consisting of the head-piece A, cone-piece B, screw-rods c, and nuts D, substantially as described.

FREDERICK W. DEXTER.

Witnesses:
  E. B. FORBUSH,
  B. H. MEALY.